United States Patent [19]

Hyvarinen et al.

[11] 4,173,774
[45] Nov. 6, 1979

[54] PARALLEL AC ELECTRICAL SYSTEM WITH DIFFERENTIAL PROTECTION IMMUNE TO HIGH CURRENT THROUGH FAULTS

[75] Inventors: Wayne E. Hyvarinen, American Township, Allen County; Lloyd J. Rosell, Lima, both of Ohio

[73] Assignee: Westinghouse Electric Corp., Pittsburgh, Pa.

[21] Appl. No.: 858,863

[22] Filed: Dec. 8, 1977

[51] Int. Cl.² .............................................. H02H 3/28
[52] U.S. Cl. ....................................... 361/87; 361/69; 361/91
[58] Field of Search ....................... 361/87, 67, 68, 69, 361/79, 84, 91, 93, 110, 111

[56] References Cited
U.S. PATENT DOCUMENTS

| | | | |
|---|---|---|---|
| 1,731,955 | 10/1929 | von Schaubert | 361/87 X |
| 2,183,537 | 12/1939 | Bostwick | 361/69 |
| 2,696,573 | 12/1954 | Patrickson et al. | 361/69 |
| 3,160,787 | 12/1964 | Sonnemann | 361/87 |
| 3,259,802 | 7/1966 | Steen | 361/48 |
| 3,377,551 | 4/1968 | Le Doux | 361/93 X |
| 3,654,516 | 4/1972 | Traversi | 361/93 X |
| 3,729,650 | 4/1973 | Cook | 361/93 X |
| 4,089,033 | 5/1978 | Mentler | 361/110 |

*Primary Examiner*—Patrick R. Salce
*Attorney, Agent, or Firm*—G. H. Telfer

[57] ABSTRACT

In systems, such as aircraft electric power generation systems, three phase AC generators are often operated in parallel when supplying power to load busses and differential protection networks are utilized in each phase of each generator for detecting current imbalance between the phase conductor at the load and the neutral conductor of each phase. In this invention there is provided voltage limiter means such as back-to-back Zener diodes across each of the current transformers related to the phase and neutral conductors which, in conjunction with the other portions of the differential protection networks: (1) prevents nuisance tripping on the occurrence of high current faults outside the differential protection zone (such as bus faults) due to normal variations of the current transformers, and (2) at the same time, provides differential protection for a generator channel over the required range, generally from very low differential fault currents to the very high differential fault currents. The high differential fault currents will appear as high through current faults for the unfaulted parallel channels.

3 Claims, 3 Drawing Figures

TO OTHER CHANNELS (PARALLELED GENERATORS)

PARALLEL AC ELECTRICAL SYSTEM WITH DIFFERENTIAL PROTECTION IMMUNE TO HIGH CURRENT THROUGH FAULTS

STATEMENT OF GOVERNMENT CONTRACT

The invention herein described was made in the course of or under a contract, or subcontract thereunder, with the U.S. Department of the Air Force.

BACKGROUND OF THE INVENTION

1. Field of the Invention

This invention relates to alternating current electrical power systems, with paralleled generators, and differential protection networks therefor.

2. Description of the Prior Art

In prior art aircraft electrical systems, it has been the practice to use a plurality of AC generators, each normally multi-phase, with the output phase conductors of individual generators connected in parallel to load busses. The neutral side conductor of each phase of each generator is grounded to a structural member proximate the generator and the neutral of the loads may also be so grounded proximate their location.

FIG. 1 shows a general schematic of previously used systems. Generators 10, 11, and 12 have phase conductors connected to load busses 14, 15, and 16, respectively, through multi-phase generator contactors 40, 41, and 42, respectively, and the phase conductors and load busses are mutually interconnected in parallel through multi-phase bus tie contactors 43 and 44. The generators also have neutral side phase conductors that are grounded proximate each generator. Various monitoring and control functions are performed by means of a differential protection network, normally one such network being associated with each phase conductor of each generator. Just one differential protection network 20 is shown in FIG. 1. The differential protection network 20 comprises current transformers 21 and 22 respectively associated with the neutral side phase conductor and with the load side phase conductor of one phase. The current transformers are in a closed loop with a pair of resistors R1 and R2. Between R1 and R2 and across the current transformer loop is a third resistor R3. (In general, R1 and R2 are of equal value and R3 is generally of higher value than R1 and R2 in order to obtain the desired sensitivity.) In normal operation, in the absence of faults, a current circulates in the loop through R1 and R2 and if there is no difference in current in the two current transformers there is no voltage across resistor R3. However, upon the occurrence of an imbalance in the currents of the two current transformers there is a voltage across R3 and this voltage is supplied to a differential protection circuit 33 which acts to deenergize generator 10 and open generator contactor 40.

Although the network 20 shown is referred to as a differential protection network, it also serves for sensing conditions other than differential faults. For those purposes, signals developed across individual resistors R1 and R2 are used for current limiting and for overcurrent sensing, respectively. In differential fault protection it is the purpose of this network to detect the occurrence of a fault, such as a short between the individual phase conductor and ground or to another line conductor, in the differential protection zone. The differential protection zone includes the generator and that portion of the phase conductor from the generator to the parallel bus. Normally, the differential protection network 20 is reliable and efficient. There are instances, however, when the occurrence of certain conditions outside the differential protection zone can impair the correct functioning of the differential protection network. This is particularly true for systems of relatively high rating, such as more than 40 KVA.

A high current through fault is a highly conductive phase-to-phase or phase-to-ground fault on a load bus outside the differential protection zone. Ground 30 in FIG. 1 shows such a phase-to-ground fault. If such a fault occurs there are known means (not shown) in the system for isolating it. Such a fault should not, however, influence the differential protection network 20. That is, under such conditions the currents in the individual phase conductor and the generator neutral side phase conductor should remain balanced. However, under high current through fault conditions, inherent variation in the characteristics of the two current transformers 21 and 22 in the loop may result in the sensing of a differential current sufficient to energize the differential protection circuit 33. In other words, it can be the case that a fault unrelated to any malfunction in or near generators may cause the generators to be removed from the system unnecessarily.

Now, consider a highly conductive phase-to-ground fault occurring within the differential protection zone such as at 34 in FIG. 1 rather than at 30. In this case, a true differential fault exists in and is correctly detected for the generator 10 channel. However, this fault appears as a high current through fault to the generator 11 and 12 channels. For the reason previously explained, the generator 11 and 12 channels, which are unfaulted, may unnecessarily be removed from the system. Therefore, the objective in a paralleled generator system is twofold; namely, to make the differential protection networks impervious to high current through faults and, at the same time, retain the sensitivity to true differential current faults.

Differential protection of electrical apparatus is a generally old art and examples include those such as Von Schaubert U.S. Pat. No. 1,731,955, Oct. 15, 1929, and Sonnemann U.S. Pat. No. 3,160,787, Dec. 4, 1964 that show solutions to problems of unmatched transformers and nuisance tripping. Also, in Steen U.S. Pat. No. 3,259,802, July 5, 1966 is shown a form of differential protection with a Zener diode used to limit the voltage of a current transformer. It is believed the prior art does not provide a simple, effective, solution to the discussed problems particularly in systems of parallel generators and where the other requirements of aircraft electrical systems are present.

The present invention is aimed at a solution to the foregoing problems.

SUMMARY OF THE INVENTION

In accordance with the present invention, there is provided an electric power generation system, such as an aircraft electric power generation system, where AC generators are operated in parallel when supplying power to load busses. Differential protection networks are employed on each phase of each generator for detecting current imbalance between the phase conductor at the load and the neutral side conductor of each phase, with voltage limiter means such as back-to-back Zener diodes across each of the current transformers related to the phase and neutral side conductors so as to prevent nuisance tripping or other malfunctioning on the occurrence of high current through faults, outside the differential protection zone, due to normal variations in the characteristics of the current transformers.

The addition of the voltage limiters, which are identical for each of the two current transformers, limit the output voltage from the current transformers. The limiting voltage is selected such that they will not limit the output to a magnitude less than that required for current limiting or overcurrent protection for a through fault outside the differential protection zone (such as at 30 in FIG. 1). When an overcurrent signal is sensed, it is used to block out any differential signal that may be created by the difference in current transformer characteristics with high through fault currents.

When a high current differential fault occurs, such as at 34 in FIG. 1, the unfaulted channels (channels 11 and 12 in FIG. 1) will function as just described. On channel 10, the current from current transformer 21 (through R1) and the current from transformer 22 (through R2) flow additively through R3 causing a differential protection signal to be developed. However, because of the high resistance of R3, there is not sufficient current through R2 to indicate an overcurrent and, hence, the differential signal is not blocked out and a differential protection trip of channel 10 will occur.

DESCRIPTION OF THE PREFERRED EMBODIMENTS

Figure 1:
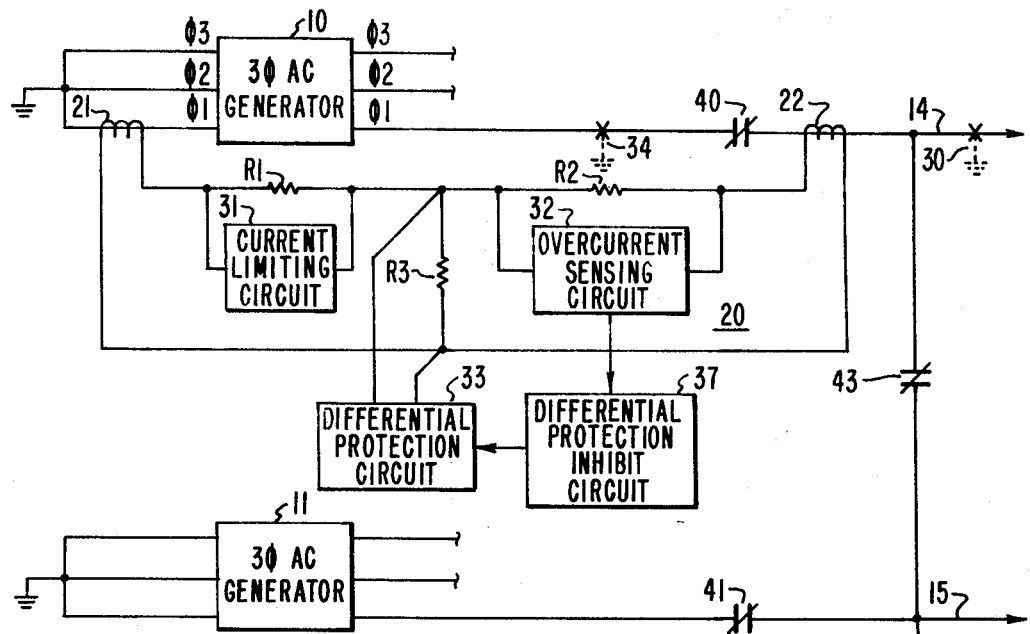
FIG. 1 is a general schematic diagram illustrating a prior art paralleled generator and differential protection network.
Figure 1:
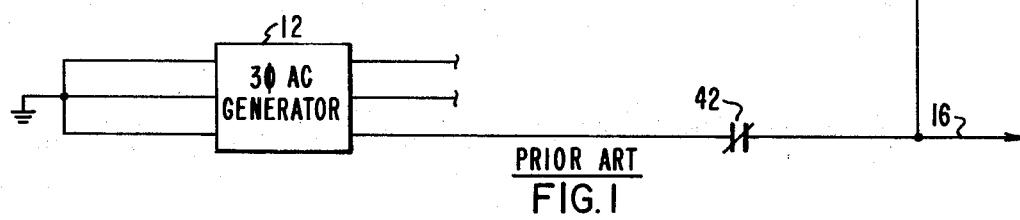
Figure 2:
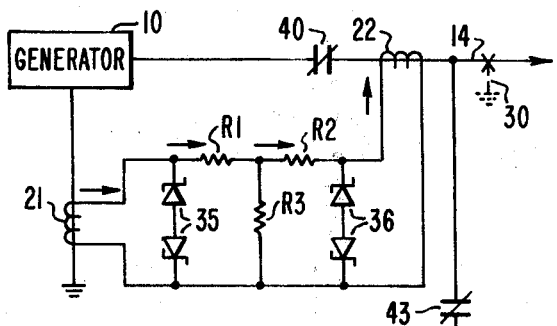
FIG. 2 is a partial system schematic diagram illustrating an embodiment of the present invention in one mode of operation.

Referring to FIG. 2, part of the system as shown in FIG. 1 is modified in accordance with this invention. Each phase of each generator of the parallel system would be so treated, although only one differential protection network is shown for convenience. The only circuit change required by this invention is the addition of voltage limiters 35 and 36 across the current transformers 21 and 22, respectively. These voltage limiters may conveniently be back-to-back Zener diodes, relatively well matched in accordance with standard commerical practices, and chosen to have a reference voltage level in accordance with certain system conditions as will be hereinafter discussed. In addition to back-to-back Zener diodes, other voltage limiters may be employed such as varistors, spark gaps and the like. In general, the other elements for the FIG. 2 system are shown in FIG. 1. The circuit of FIG. 1 includes an illustration of the overcurrent sensing and current limiting circuits 31 and 32 related to the resistors R1 and R2, respectively, differential protection circuit 33 related to resistor R3, and differential protection inhibit circuit 37 connected between circuits 32 and 33. The provision of these circuits themselves is not novel by this invention, but cooperation of the overall system provides the desired functions of the present invention.

The current limiting and overcurrent protection functions as sensed by resistors R1 and R2 are not to be interfered with by the Zener diode pairs 35 and 36. The system operation on through faults, such as at 30, will therefore be the same as for an isolated system. A sensed overcurrent signal would be used to lock out any differential signal that may be created by the difference in current transformer characteristics with high fault currents (this is shown in FIG. 1).

The arrows in FIG. 2 illustrate the main current path for the secondary current in the loop through the current transformers and R1 and R2. Under normal conditions, the voltages generated across the current transformers would be below the voltage level of the Zener diodes.

Figure 3:
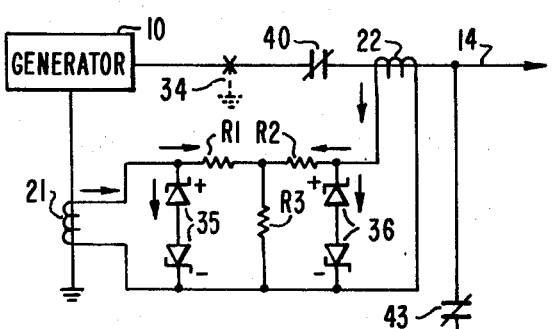
FIG. 3 is a partial system schematic diagram of an embodiment of the present invention in another mode of operation.

Upon occurrence of a differential fault, such as at 34, the condition shown in FIG. 3 occurs. As the fault is in the differential protection zone, the outputs of the current transformers are added by taking the paths through R1 and R2 and down through R3 (as shown by the arrows). As R3 has a relatively large resistance value compared to R1 and R2, a large voltage will develop across R3 relative to voltages developed across R1 and R2. Now with the addition of the Zener clamps 35 and 36 across the current transformers, the level of signals developed across R2 can be controlled to a level that is below the level that is required for a sensed overcurrent. For example, if R3 is ten times larger than R1 or R2, and the Zener diodes are selected as 15 volt devices, the maximum voltage across R2, or R1, can therefore be equal to $$V_{R2} = 15 \cdot \left( \frac{.5R2}{R3 + .5R2} \right),$$

and since

R2=0.1R3, $V_{R2}$=0.715 volts.

This voltage is well below the voltage that would be used as the overcurrent sense level on the system.

Normal Zener diode component tolerances do not impair the performance of the certain system as intended.

Other channels connected to the system will provide fault current to the fault at 34 in FIG. 3. Their differential protection circuits will see the fault current as a through fault, thus locking out the differential protection circuit preventing nuisance trips of the unfaulted systems. Tests have been performed on systems as described and shown under various fault situations which verified their performance.

The circuits 31, 32, 33 and 37 of FIG. 1 are preferably to be included in systems in accordance with this invention though not shown in FIGS. 2 and 3. Each of the circuits 31, 32, 33 and 37 may be as heretofore known in the art and no detailed illustration thereof is required for those skilled in the art. A prime virtue of this invention is to permit direct application of such prior art circuits in a system made much more reliable and effective by the simple expedient of the voltage limiters 35 and 36.

What we claim is:

1. An electrical power system comprising:
    a plurality of multi-phase generators having outputs each connected with a plurality of phase conductors that are mutually interconnected in parallel for supplying at least one load, each of said generators also having a neutral conductor that is grounded proximate said generator;

at least one phase conductor and at least one of said generators having a differential protection network between said phase conductor and said neutral conductor of said one generator;

said differential protection network comprising (a) means for deriving currents from said phase conductor and from said neutral conductor proportional to the respective currents in said conductors, (b) voltage limiting means connected across each of said means for deriving current to prevent disablement of said differential protection network and to prevent nuisance tripping of said differential protection network upon occurrence of faults on the parallel connected load bus, and (c) a first resistor in series with the means for deriving current from said phase conductor, a second resistor in series with said means for deriving current from said neutral conductor and a third resistor connected across said means for deriving currents and from between a common point of said first and second resistors, one of said first and second resistors providing an overcurrent voltage signal applied to an overcurrent sensing circuit which is in turn related to a differential protection inhibit circuit, said voltage limiting means having a limiting voltage magnitude of less than that of said overcurrent voltage signal that actuates said overcurrent sensing circuit, said voltage limiting means being directly connected in a circuit with said resistors and said means for deriving currents.

2. An electrical power system in accordance with claim 1 wherein: said voltage limiting means each comprise a pair of Zener diodes connected in back-to-back relation and each of said means for deriving current comprises a current transformer.

3. An electrical power system in accordance with claim 1 wherein: said first and second resistors are of equal resistance value and said third resistor is of greater resistance value than said first and second resistors.

* * * * *